No. 705,789. Patented July 29, 1902.
W. W. REEVES.
MOLD FOR HOLLOW CONCRETE ARTICLES.
(Application filed Oct. 2, 1901.)

(No Model.) 2 Sheets—Sheet 1.

WITNESSES
INVENTOR
William W. Reeves

No. 705,789. Patented July 29, 1902.
W. W. REEVES.
MOLD FOR HOLLOW CONCRETE ARTICLES.
(Application filed Oct. 2, 1901.)
(No Model.) 2 Sheets—Sheet 2.
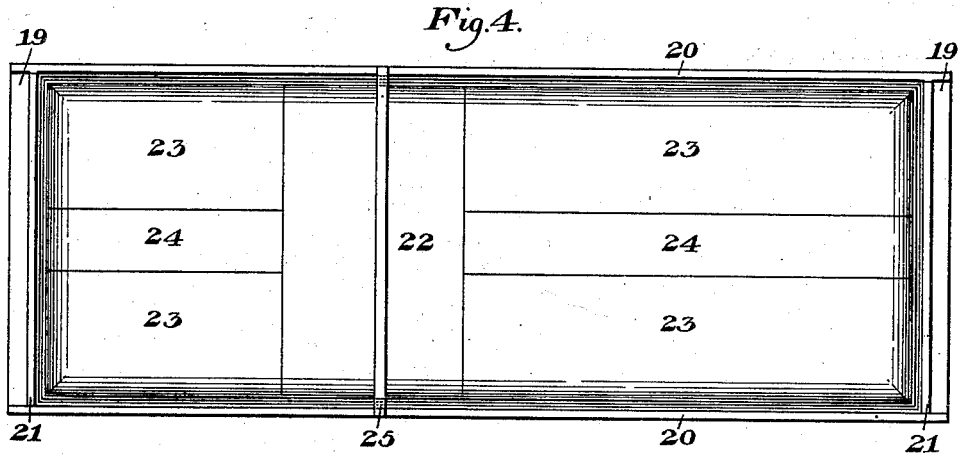
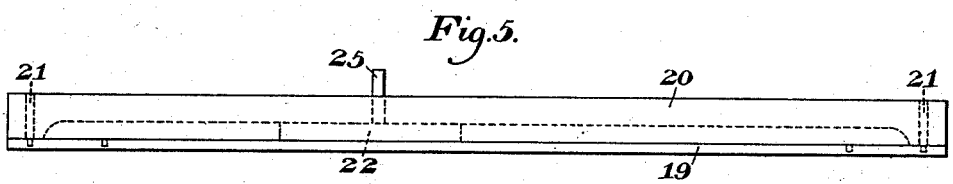
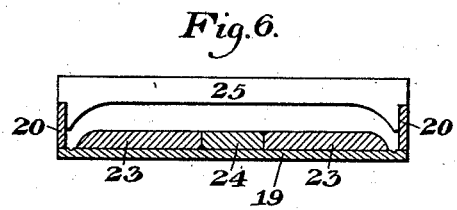
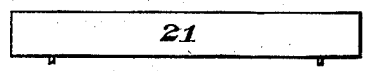
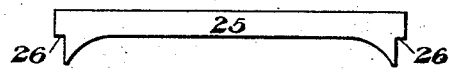
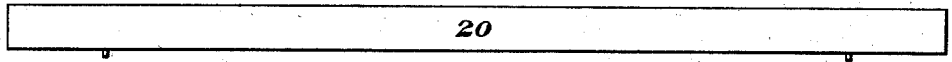
WITNESSES
INVENTOR

UNITED STATES PATENT OFFICE.

WILLIAM W. REEVES, OF BRADDOCK, PENNSYLVANIA.

MOLD FOR HOLLOW CONCRETE ARTICLES.

SPECIFICATION forming part of Letters Patent No. 705,789, dated July 29, 1902.

Application filed October 2, 1901. Serial No. 77,304. (No model.)

*To all whom it may concern:*

Be it known that I, WILLIAM W. REEVES, of Braddock, Allegheny county, Pennsylvania, have invented a new and useful Mold for Hollow Concrete Articles, of which the following is a full, clear, and exact description, reference being had to the accompanying drawings, forming part of this specification, in which—

Figure 1:
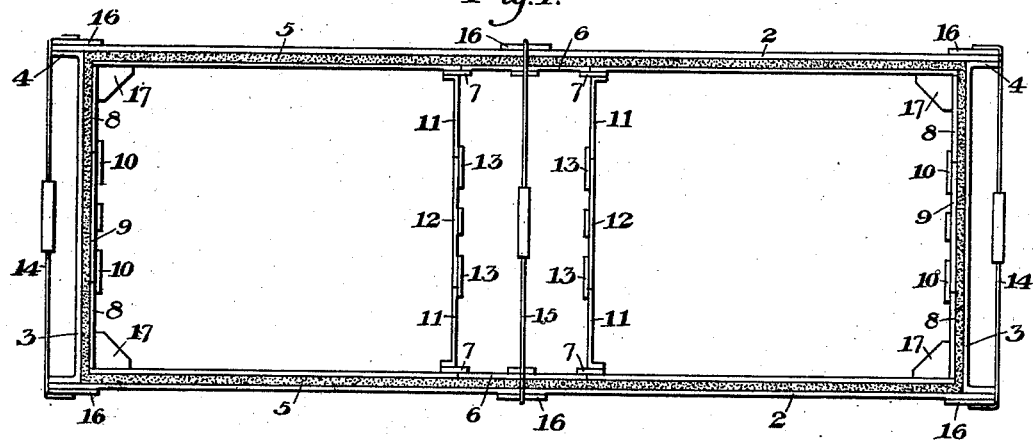
Figure 2:
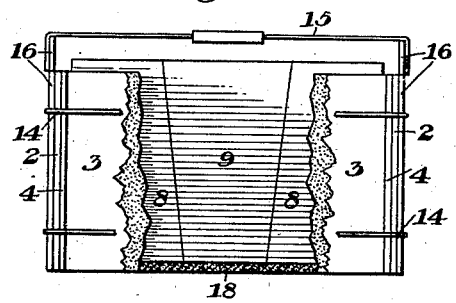
Figure 3:
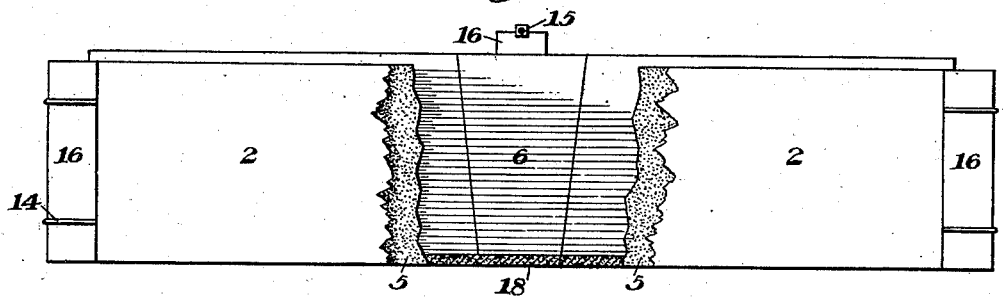

Figure 1 is a top plan view of a mold constructed in accordance with my invention. Figs. 2 and 3 are respectively an end and side elevation of the same, partly broken away. Fig. 4 is a top plan view of the mold for the cover of the casket or other article formed in the mold of Figs. 1 to 3, inclusive. Fig. 5 is a side elevation of the cover-mold. Fig. 6 is a vertical cross-section of the same. Figs. 7 and 8 show the end and side boards of the cover-mold, and Fig. 9 is a front view of the shaper for the cover.

My invention relates to the molds employed for forming hollow concrete articles, such as burial-tombs; and its object is to provide a mold for this purpose which may be adjusted to form tombs or hollow articles of different widths and lengths and, further, to provide a cover-mold which is similarly adjustable to mold the covers to fit the tombs of different sizes formed in my mold.

In the drawings, referring to Figs. 1, 2, and 3, 2 2 represent the side boards, and 3 3 the end boards, of my improved mold. The end boards are preferably provided with end flanges or strips 4, which fit against the inner faces of the side boards and hold the end boards in proper right-angled position while allowing them to be adjusted to different positions. The adjustable core of the mold is provided with side boards and end boards, the side boards consisting of two parts 5 5, with an intermediate downwardly-tapering board 6, fitting against the correspondingly-tapered faces of the inner end of the pieces 5 5. This removable piece 6 may be held in place against falling inwardly by guides or cleats 7 7, secured to the parts 5. The end boards of the core are formed similarly to the side boards, each consisting of two outer similar parts 8 8, with a tapering dividing part 9, guided and held by cleats 10, secured to the inner faces of the boards 8. The central portion of the core is braced laterally by cross-boards, each consisting of two end parts 11 and a central tapering board 12, guided by projecting cleats 13, secured to the parts 11. These cross-boards are preferably provided with flanges or end strips 13', which fit against the guides 7, the braces extending downwardly in an inclined position in parallel with the edges of the boards 6. The parts of the mold are held in place by the usual hook-clamps 14 at the ends and a similar hooked clamp 15, extending across the top at the center. These several clamps are preferably adjustable in length and engage separate pieces 16, resting against the outer faces of the mold. Corner-brackets 17, secured to the inner faces of the core side boards, hold the parts 8 8 of the four end boards against collapsing inwardly.

In molding the tomb the outer shell of the mold is assembled and clamped together, forming a bottomless box. The cement or concrete is then spread within the box to form the bottom of the tomb, as shown at 18 in Figs. 2 and 3. The parts of the core are then inserted and the braces and clamps applied, and the concrete is then filled into the space between the core and the mold in the usual manner.

To change the size of the tomb, it is only necessary to adjust the end boards of the mold along the side boards and exchange the dividing-boards 6 and 9 of the core for other boards of similar shape, but of greater or less width. In changing the width of the tomb the mold side boards are changed for other boards of a different length.

For the forming of the cover I use the mold shown in the remaining figures and which consists of a flat base-board 19, with the side board 20 and end boards 21, which are provided with pins fitting in holes in the base-board, as shown. Upon the base-board is laid a core consisting of seven parts—viz., a cross-board 22, longitudinal boards 23, arranged in two pairs, and separating-boards 24 between the pairs 23. The core thus formed is rounded at its edges to give a neat finish to the interior of the cover. To shape the top of the cover, I provide a cross-strip 25, having shoulders 26, which fit upon the side boards, and having a curved inner contour, as shown, to shape the top of the cover.

In forming the cover the parts of the mold and core are assembled as shown, the concrete is filled in over the core, and the shaper is then moved along from end to end to properly distribute and shape the concrete.

In changing the size of the cover the mold is changed by replacing the cross-board 22 and the dividing-boards 24 by others of different size.

The advantages of my invention result from the capability of making tombs and covers therefor of different sizes in a single mold for each. The necessity for a different mold for each size of tomb is thus avoided, and the necessary adjustments can be quickly and easily made.

Many changes may be made in the form and arrangement of the parts which may be used for shaping any hollow articles in concrete within the scope of my invention.

I claim—

1. A mold for concrete tombs, &c., having a core with end boards, each consisting of a plurality of adjustable parts; substantially as described.

2. A mold for hollow concrete articles having a core with side boards made in two or more parts and provided with adjustable separators; substantially as described.

3. A mold for concrete tombs, &c., having a core with side boards made in two or more parts and provided with adjustable separators, and end boards each consisting of a plurality of adjustable parts; substantially as described.

4. A mold for hollow concrete tombs, &c., having side boards and outwardly-flanged end boards adjustable along the side boards; said parts having means for clamping them in place; substantially as described.

5. A mold for hollow concrete tombs, &c., having a core with side boards made in two or more parts with a downwardly-tapering separator between said parts, and holders for preventing the separator from collapsing inwardly; substantially as described.

6. A cover-mold having a core adjustable in transverse and longitudinal dimensions; substantially as described.

7. A cover-mold having a longitudinally-movable shaper fitting and guided upon the side board; substantially as described.

In testimony whereof I have hereunto set my hand.

WILLIAM W. REEVES.

Witnesses:
    THOS. M. BENNER,
    T. C. NOBLE.